(12) United States Patent
Zohar et al.

(10) Patent No.: US 7,877,547 B2
(45) Date of Patent: Jan. 25, 2011

(54) METHOD, SYSTEM AND CIRCUIT FOR EFFICIENTLY MANAGING A CACHE STORAGE DEVICE

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 11/123,633

(22) Filed: May 6, 2005

(65) Prior Publication Data
US 2006/0143383 A1 Jun. 29, 2006

Related U.S. Application Data

(60) Provisional application No. 60/639,780, filed on Dec. 29, 2004.

(51) Int. Cl.
G06F 12/00 (2006.01)
G06F 13/00 (2006.01)
G06F 13/28 (2006.01)

(52) U.S. Cl. .............. 711/129; 711/173; 711/E12.046
(58) Field of Classification Search .................. None
See application file for complete search history.

(56) References Cited

U.S. PATENT DOCUMENTS 4,430,712 A * 2/1984 Coulson et al. ............ 707/205
6,438,652 B1 * 8/2002 Jordan et al. .............. 711/120
6,532,513 B1 * 3/2003 Yamamoto et al. ......... 711/100
6,711,635 B1 * 3/2004 Wang ......................... 710/56
2003/0093622 A1 * 5/2003 Desota et al. ............... 711/129
2004/0088514 A1 * 5/2004 Bullen et al. ............... 711/202
2004/0250014 A1 * 12/2004 Sohn ......................... 711/112

* cited by examiner

*Primary Examiner*—Matt Kim
*Assistant Examiner*—Ralph A Verderamo, III
(74) *Attorney, Agent, or Firm*—Griffiths & Seaton PLLC

(57) ABSTRACT

A system, method and circuit for efficiently managing a cache storage device. A cache storage device may include a cache management module. The cache management module may be adapted to generate a management unit and to associate the management unit with new data that is to be written into the cache. The cache management module may be further adapted to assign two or more allocation units for each management unit, to store the new data in the cache. A cache management module may include a management unit module. The management unit module may be adapted to generate management units associated with predefined global cache management functions. The cache management module may further include an allocation unit module in communication with the management unit module. The allocation unit module may be adapted to assign allocation units for storing data written into the cache.

21 Claims, 7 Drawing Sheets

METHOD, SYSTEM AND CIRCUIT FOR EFFICIENTLY MANAGING A CACHE STORAGE DEVICE

CROSS-REFERENCE TO RELATED APPLICATION

This application claims the benefit of U.S. Provisional Patent Application 60/639,780, filed Dec. 29, 2004, which is incorporated herein by reference

FIELD OF THE INVENTION

The present invention generally relates to the field of mass-storage systems. More particularly, the present invention relates to a system, method and circuit for efficiently managing a cache storage device.

BACKGROUND OF THE INVENTION

A data storage system is typically able to service "data write" or "data read" requests issued by a host computer. A host may be connected to the storage system's external controller or interfaces (IF), through various channels that transfer both data and control information (i.e. control signals). Physical non-volatile media in which data may be permanently or semi-permanently stored includes arrays of disk devices, magnetic or optical, which are relatively less expensive than semiconductor based volatile memory (e.g. Random Access Memory) but are relatively much slower in being accessed.

A cache memory is a high-speed buffer located between an IF and the disk device(s), which is meant to reduce the overall latency of Input/Output (I/O) activity between the storage system and a host accessing data on the storage system. Whenever a host requests data stored in a memory system, the request may be served with significantly lower latency if the requested data is already found in cache, since this data must not be brought from the disks. As of the year 2004, speeds of IO transactions involving disk activity are typically on the order of 5-10 milliseconds, whereas IO speeds involving cache (e.g. RAM memory) access are on the order of several nanoseconds.

In data storage systems, data may be internally managed in terms of functional data units hereafter called "partitions". When the cache receives new data which is to be written into the cache, the cache determines with which partition the new data is associated and whether storage space in the cache is already allocated for the partition with which the new data is associated. If it is determined that the cache has already allocated storage space for the partition with which the new data is associated, the cache will simply store the data in the storage space allocated for that partition. However, if it is determined that the cache has yet to allocate storage space for the partition with which the new data is associated, the cache must allocate storage space corresponding to an entire partition in order to store the new data, even if the amount of storage space necessary to store the segment of data which is to be written into the cache constitutes only a small fraction of the storage space allocated for each partition.

Typically, partitions are also the unit of reference used by the cache management modules and algorithms for analyzing some global aspects of the cache's performance and for implementing various management procedures or functions, such as, for example, collection and analysis of information relating to data currently in the cache, management of cache replacement mechanisms or procedures, prefetch operations and the exchange of data with other components of the mass-storage system.

The partition's dual functionality presents a well-known yet persistently challenging predicament. On the one hand, larger, and consequently, fewer, partitions in the cache imply lower management overhead. On the other hand, if substantially large partitions are implemented in the cache, a large amount of precious cache storage space may be allocated for storing even small amounts of data. The result is that the cache's memory space is not being allocated efficiently.

There is thus a need for a method, a system and a circuit for efficiently managing a cache storage device. There is a further need for a method, a system and a circuit for providing a cache storage device characterized in low management overhead costs and, at the same time, maintaining efficient allocation of the cache's storage space.

SUMMARY OF THE INVENTION

Some embodiments of the present invention relate to a system, method and circuit for efficiently managing a cache storage device. In accordance with some embodiments of the present invention, a cache storage device may include a cache management module. In accordance with some embodiments of the present invention, the cache management module may be adapted to generate a management unit and to associate the management unit with new data that is to be written into the cache. The cache management module may be further adapted to assign two or more allocation units for each management unit, to store the new data in the cache.

In accordance with some embodiments of the present invention, a cache management module may include a management unit module. The management unit module may be adapted to generate management units associated with predefined global cache management functions. The cache management module may further include an allocation unit module in communication with the management unit module. The allocation unit module may be adapted to assign allocation units for storing data written into the cache. The allocation unit module may be adapted to assign two or more allocation units for each management unit.

In accordance with some embodiments of the present invention, a cache storage device may include a cache management module. In accordance with some embodiments of the present invention, the cache management module may be adapted to generate one or more cache management units associated with predefined global cache management functions or procedures. In accordance with some embodiments of the present invention, the cache management module may be further adapted to assign allocation units for each cache management unit. In accordance with some embodiments of the present invention, each allocation unit may be further associated with predefined allocation functions or procedures.

In accordance with some embodiments of the present invention, a computer readable program code may be provided. In accordance with some embodiments of the present invention, the computer readable program may be configured to cause the computer to generate a management unit and to associate the management unit with new data that is to be written into the cache. The computer readable program may be further configured to assign two or more allocation units for each management unit to store the new data in the cache.

In accordance with further embodiments of the present invention, the computer readable program code may cause the computer to generate one or more cache management units associated with predefined global cache management functions or procedures. The computer readable program may be further adapted to assign allocation units associated with predefined allocation functions or procedures for each cache management unit.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
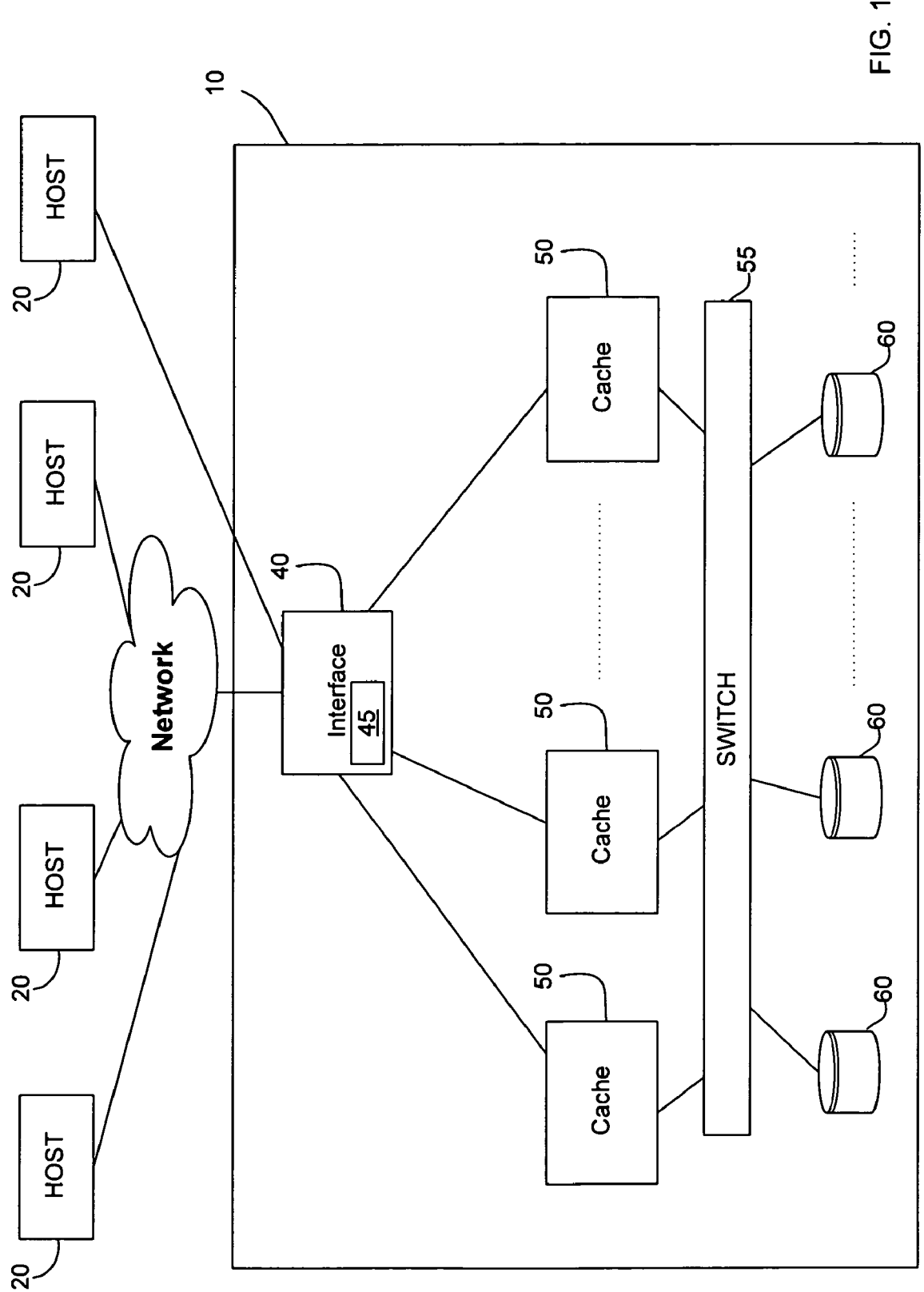
FIG. 1 is a block diagram illustration of a mass-storage system including a plurality of cache storage devices, as part of some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Reference is now made to FIG. 1, which is a block diagram illustration of a mass-storage system including a plurality of cache storage devices, as part of some embodiments of the present invention. As part of some embodiments of the present invention, one or more host devices 20 may be in communication with a mass-storage system 10. The mass-storage system 10 may be adapted to service I/O requests generated by one or more of the host devices 20. As part of some embodiments of the present invention, the host devices 20 may be connected to the storage system 10 either directly or via a distributed data network.

As part of some embodiments of the present invention, the storage system 10 may include one or more cache storage devices 50 and one or more disk devices 60. As part of some embodiments of the present invention, each of the disk devices 60 in the storage system 10 may be associated with one of the cache devices 50 in the storage system 10. As part of other embodiments of the present invention, each disk 60 may be associated with more than one cache 50, and the storage system may include a switch 55 to direct traffic to and from the cache devices 50 to the appropriate disk 60 and from the disk devices 60 to the appropriate cache 50, the storage system 10 shown in FIG. 1 indeed includes more than one cache 50 and a switch 55 as described above.

As part of some embodiments of the present invention, the storage system 10 may be adapted to substantially permanently store data in the disk devices 60 or semi-permanently store the data in the disk devices 60 (e.g. magnetic disk or semi-conductor based non-volatile mass memory arrays). As part of further embodiments of the present invention, the storage system 10 may be adapted to substantially temporarily store data in the cache device or devices 50.

In the storage system 10 shown in FIG. 1, data may be stored in terms of logical units (LUs). As part of some embodiments of the present invention, whenever one of the host devices 20 are communicating with the storage system, the host 20 may be adapted to generate requests, for example, "read" and/or "write" requests, which relate to a certain LU or, more commonly, to a specific portion(s) of a specific LU. Each request generated by the host may relate to a specific string of blocks of a certain LU. As part of some embodiments of the present invention, each request that is to be transmitted by one of the hosts 20 to the storage system 10 may include data relating to the specific logical unit or to the specific portion of a certain logical unit with which the request is associated. For example, as part of some embodiments of the present invention, each request may include data relating to a specific sequence or succession of blocks within a certain logical unit with which the request is associated.

As part of some embodiments of the present invention, the storage system 10 may include one or more interfaces (IFs) 40. As part of some embodiments of the present invention, each of the IFs 40 may include a partition map 45. As part of some embodiments of the present invention, each partition registered in the partition map 45 may be associated with a specific logical unit or with a specific portion of a certain logical unit (e.g., with a certain sequence of blocks within that logical unit).

In accordance with some embodiments of the present invention, each partition listed in the partition map 45 may be associated with a particular cache device 50 in the storage system 10. Whenever data from one of the hosts 20 is received at one of the IFs 40, the partition map 45 may be consulted in order to determine with which partitions the incoming data is correlated, and which cache device 50 corresponds to each of the partitions with which the incoming data is associated. Once the IFs 40 determine with which partitions the incoming data is associated, the IFs may determine with which particular cache device 50 the specific partition is correlated. The IFs 40 may then signal to the appropriate cache 50, to indicate to that cache 50 that data which is associated with a certain partition with which this cache 50 is correlated has been received in the storage system 10. In accordance with some embodiments of the present invention, the IFs 40 may be adapted to indicate to the cache 50 what portion of the partition with which that cache 50 is associated is included in the incoming data (e.g., what sequence of blocks within that partition is included in the incoming data).

In accordance with some embodiments of the present invention, when the cache 50 receives the signal indicating that data which is associated with a partition with which this cache 50 is correlated has been received in the storage system 10, the cache 50 may analyze the data and may decide to instruct the IFs 40 to forward the incoming data associated with a certain partition.

As part of some embodiments of the present invention, a single request may, in some cases, be comprised of a string of blocks that transgresses the boundaries of any one, single partition. In such circumstances, after the IF 40 determines that the sequence of blocks in a certain request is not within the boundaries defined for any one-single partition, the IF 40 may handle the different portions of the request which are associated with a different partition, separately, for example, one after the other.

It should be noted, that in some cases, there may be more than one cache device 50 in the system 10, and different portions of a single request may be forwarded to different cache devices and not necessarily to the same cache device.

It should be noted that the storage system 10 shown in FIG. 1 and described hereinabove is exemplary in nature, and that other possible storage systems having different architectures may be used as part of some embodiments of the present invention.

In the description of some embodiments of the present invention reference is made to the handling by the cache of a request generated by a host and arriving into the storage system through an IF. However, it should be noted that the present invention is not limited in this respect. Rather, in accordance with some embodiments of the present invention, the data to be written into the cache may arrive for other components in the storage system or which are associated with the storage system, including data arriving into the cache from other caches in a distributed caching storage system, for example, as part of a caching consolidation process, data arriving into the cache from a disk as part of a distributed caching storage system. These and other components of the storage system may include copies of the partition map which may be consulted in order to determine with which cache a certain segment of data is associated.

Figure 2:
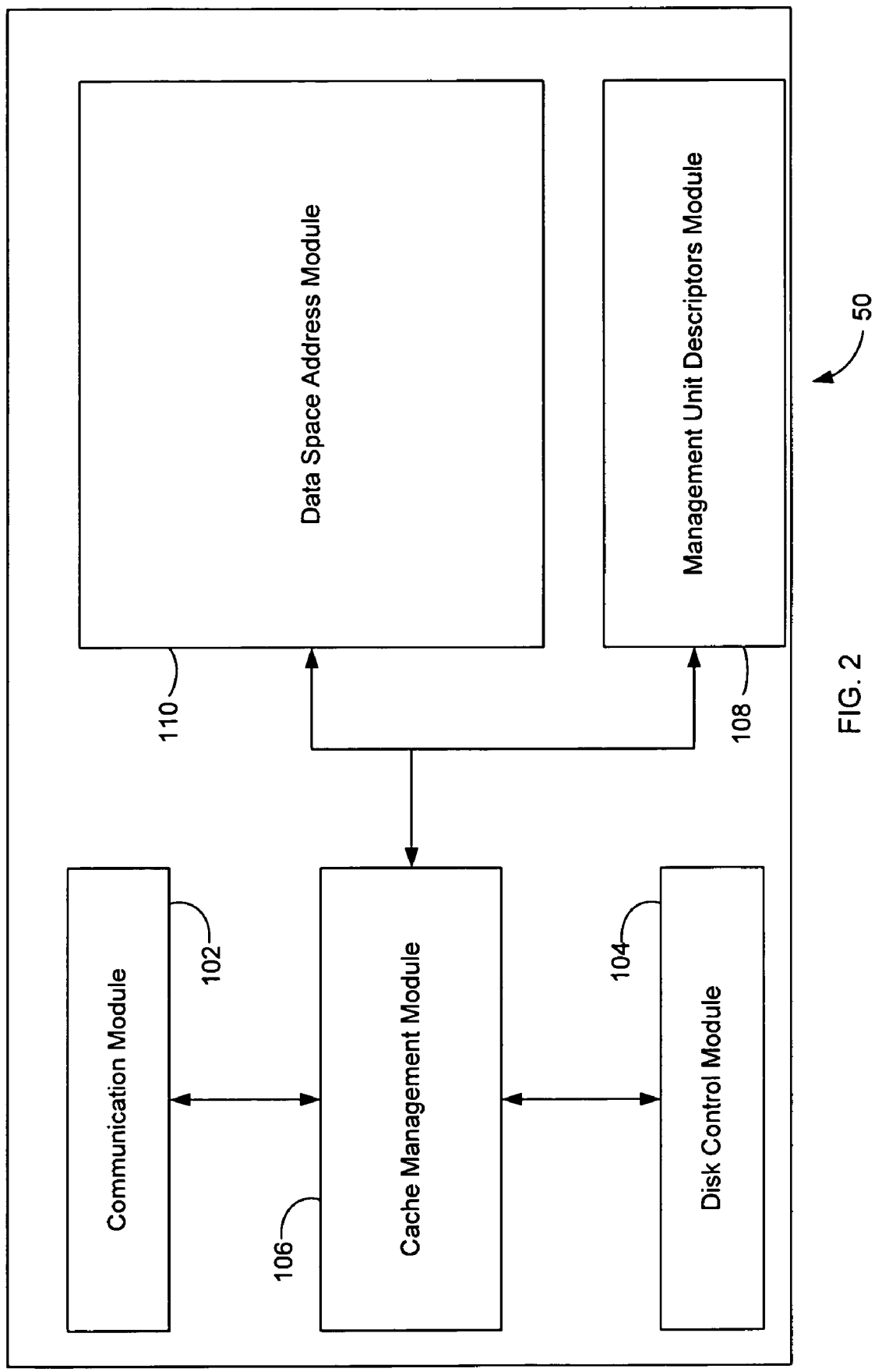
FIG. 2 is a block diagram illustration of a cache storage device including a cache management module in accordance with some embodiments of the present invention.

Turning now to FIG. 2, there is shown a block diagram illustration of a cache storage device including a cache management module, in accordance with some embodiments of the present invention. As part of some embodiments of the present invention, the cache storage device 50 may include a communication module 102. The communication module 102 may be adapted to receive data from the hosts 20 either directly or through the IFs 40 associated with the storage system 10, and to send data to the hosts 20.

As part of some embodiments of the present invention, the cache 50 may also include a disk control module 104. The disk control module 104 may be adapted to manage the interaction between the cache 50 and the disk devices 60 associated with that cache 50. As part of further embodiments of the present invention, the communication module 102 and the disk control module 104 may be combined and may be implemented in a single component.

In accordance with some embodiments of the present invention, the cache device 50 may include a cache management module 106. The cache management module 106 may be adapted to manage the operation of one or more of the elements associated with the cache 50.

In accordance with some embodiments of the present invention, the cache management module 106 may be in communication with the IFs 40, for example, through the communication module 102. In accordance with some embodiments of the present invention, once the IFs 40 determine with which partition, and consequently with which cache 50, an incoming request (or a specific segment of the request) is correlated, the IFs 40 may indicate to that cache 50 that a request (or a specific segment of a request) correlated with a certain partition with which that cache 50 is associated has been received in the storage system 10.

In accordance with some embodiments of the present invention, the IFs 40 may indicate to the cache 50 with which partition the request (or a specific segment of the request) is correlated. In accordance with further embodiments of the present invention, as part of indicating to the cache with which partition the request (or a specific segment of the request) is correlated, the IFs 40 may be adapted to indicate to the cache 50 which data blocks (of a certain LU) associated with that partition are included in the request.

The process detailed hereinabove describes one exemplary process whereby a host 20 generates a request and (through an interface) the request is addressed to a certain cache device 50 together with data relating to which data blocks (of a certain LU) associated with that partition are included in the request. However, it should be noted that the present invention is not limited to the handling of requests arriving from one or more hosts 20, rather, in accordance with further embodiments of the present invention, the data to be handled by the cache device may be generated by other devices associated with the storage system and/or by other components of the storage system.

In accordance with some embodiments of the present invention, the cache 50 may be adapted to generate one or more management units. In accordance with further embodiments of the present invention, each management unit may be correlated with a particular partition. In accordance with further embodiments of the present invention, each management unit may be uniquely correlated with a particular partition, such that for each partition associated with a certain cache device 50, the cache 50 may be adapted to generate no more than one management unit. In accordance with further embodiments of the present invention, the cache management module 106 may also be adapted to select one or more existing management units associated with partitions for which management units have already been generated. The process of determining whether to select an existing management unit or to select an existing management unit shall be discussed in greater detail hereinbelow.

In accordance with some embodiments of the present invention, whenever the cache 50 receives, as described above, an indication from a certain IF 40 that a certain request or that a particular portion of a certain request is associated with a specific partition which is associated with that cache 50, the cache management module 106 may determine whether a new management unit should be generated and associated with the received data, or whether the received data should be associated with an existing management unit. In accordance with further embodiments of the present invention, as part of determining whether a new management unit should be generated or whether to use an existing management unit, the cache management module 106 may check whether a management unit correlated with the partition which is indicated to be associated with the request or with a portion of the request exists in the cache 50. The process of registering the management units in the cache 50 shall be discussed in greater detail hereinbelow.

In accordance with some embodiments of the present invention, if the cache management module 106 determines that a certain management unit which is correlated with the same partition with which the request or a particular portion of the request is associated, has already been generated, the cache management module 106 may associate the request or the particular portion of the request with the existing management unit. The cache management module 106 may register the association between the request or the particular portion of the request and the existing management unit, for example, in a descriptors module 108 which will be discussed in greater detail hereinbelow.

In accordance with some embodiments of the present invention, if however, the cache management module 106 determines that none of the existing management units are correlated with the partition with which the request or the particular portion of the request is associated, the cache management module 106 may generate a new management unit correlated with that partition, and may associate the request or the particular portion of the request associated with that partition with the newly generated management unit.

Some aspects of the functionality of the management units, in accordance with some embodiments of the present invention, shall be discussed in greater detail hereinbelow.

It should be noted, that once a management unit is deleted from the cache (for example, when all the data in the cache associated with the management unit is deleted), for any reason, including as part of a replacement procedure, that management unit ceases to exist. Thus, for example, when a subsequent indication is received at the cache 50 that a certain request or portion of a certain request is associated with the same partition which was correlated with the deleted management unit, the cache management module 106 for whom the deleted management unit simply does not exist, may generate a new management which is correlated with that partition.

In accordance with some embodiments of the present invention, in addition or in alternative to receiving an indication with regards to which partition is associated with a certain segment of data (request or portion of a request) that is to be written into the cache, the cache management module 106 may receive, for example, from the IFs 40, an indication relating to the specific data blocks (of a certain LU) which are associated with that partition and which are included in the segment of data to be written into the cache 50.

In accordance with some embodiments of the present invention, the cache management module 106 may be adapted to assign for each management unit up-to two or more allocation units. In accordance with further embodiments of the present invention, by assigning an (one or more) allocation unit to a certain management unit, the cache management module 106 may allocate a predetermined amount of cache storage space for storing in the cache 50 data associated with that allocation unit and with that management unit.

In accordance with some embodiments of the present invention, each allocation unit assigned for a certain management unit may be associated with a particular segment of the partition with which the management unit is correlated. In accordance with further embodiments of the present invention, each allocation unit assigned for a certain management unit may be uniquely associated with a specific portion of the partition with which that management unit is associated.

In accordance with some embodiments of the present invention, the cache management module 106 may be adapted to assign for each management unit up-to a predetermined number of allocation units (two or more). In accordance with further embodiments of the present invention, the cache management module 106 may be configured to divide (logically) each partition associated with a certain cache 50 to a predetermined number of equal segments corresponding to the maximum number of allocation units which may be assigned for each management unit in that cache 50. The cache management module 106 may be adapted to associate each of these segments of the partition with a specific allocation unit, such that when all the allocation units which may potentially be assigned for any management unit in the cache 50 are combined, they collectively correspond to an entire partition.

In accordance with some embodiments of the present invention, whenever a new management unit is generated in the cache and is registered in the descriptors module, the cache management module 106 may be adapted to also record each of the allocation units which may be associated with the newly generated management unit and may also record in the descriptors module the specific segment of the partition with which each of the allocation units is associated. It should be noted that although following the generation of a certain management unit all the allocation units which may be assigned for that management unit may be recorded, some of the allocation unit may not necessarily also be assigned at that time, and in fact, in many cases although all of the allocation units are recorded, some of the allocation units will not be assigned at that point (and may or may not be assigned at a later point).

In accordance with some embodiments of the present invention, whenever an allocation unit is assigned for a certain management unit, a certain area of the cache's storage space may be allocated for and associated with the assigned allocation unit. In accordance with further embodiments of the present invention, the cache storage space area that may be associated with and allocated for an assigned allocation unit may be of a predetermined size. In accordance with yet further embodiments of the present invention, the cache storage space area that is allocated for and associated with the assigned allocation unit may be used to store in the cache 50 the segment of data which has been associated with the assigned allocation unit, as will be described in greater detail hereinabove.

In accordance with some embodiments of the present invention the specific cache storage area that is allocated whenever an allocation unit is assigned may be determined in accordance with the replacement procedures implemented by the cache 50. For example, assuming that the cache is implementing a FIFO replacement procedure (and assuming that the cache 50 has no free space available to allocate for a newly assigned allocation unit), the cache management module 106 may be required to discard the data stored in the cache storage space area that is the least recent to have been allocated (assuming there is no unallocated cache storage space area currently in the cache) and may reallocate that cache storage space area for the newly assigned allocation unit. The process of replacing data in the cache is well-known to those of ordinary skill in the art. The present invention is not limited to the use of any one particular replacement procedure, mechanism and/or algorithm and may be applied to any such procedure, mechanism and/or algorithm.

In accordance with some embodiments of the present invention, if the cache management module 106 determines that an allocation unit associated with that segment of that partition has already been assigned, the cache management module 106 may associate the new data with the assigned allocation unit and may store the data to be written into the cache in the area of cache storage space associated with the assigned allocation unit. However, if the cache management module 106 determines that none of the assigned allocation units are correlated with the specific segment of the specific partition with which the data to be written is associated, the cache management module 106 may assign a new allocation unit for an existing management unit associated with the partition with which the received data is associated or for a newly generated management unit associated with the partition with which the received data is associated (in case none of the existing management units is associated with the partition with which the incoming data is associated, for example).

In accordance with some embodiments of the present invention, whenever the cache receives an indication from the IFs 40 that a portion of a request that is to be written into the cache 50 is associated with a certain partition with which that cache 50 is associated, the cache 50, after selecting the appropriate existing management unit or generating the appropriate new management unit, as described above, may determine what particular segment of the partition is included in the request (which blocks, for example) and may calculate which one or more allocation units correspond to that segment of that partition.

In accordance with some embodiments of the present invention, once the cache management module 106 calculated which one or more allocation units correspond to that segment of that partition, the cache management module 106 may select one of the allocation units calculated above, and may assign that allocation unit to the management unit correlated with the same partition. Once the allocation unit is assigned for a certain management unit, the cache management module may allocate a predetermined amount of cache storage space for that allocation unit. The assignment of the allocation unit and the allocation of the storage space for the assigned allocation unit may be recorded in a descriptors module, as discussed in greater detail below.

In accordance with some embodiments of the present invention, once the cache 50 selected or generated the appropriate management unit, and has assigned or selected the appropriate allocation unit(s), as described above, the cache 50 may bring from the Ifs 40 all the data to be written into the cache which is associated with that partition which is currently being handed by the cache 50. When the data is received at the cache 50, the cache 50 may temporarily store the data, for example, in a portion of the cache's data storage space address 110, and may then proceed to handle the storage of data in portions which are within the boundaries of one of the segments of the partitions corresponding to a single allocation unit. The cache management module 106 may thus handle each segment of the partition corresponding to one of the allocation units which may be assigned for the management unit associated with that partition individually and one at a time, until all the data is stored in the cache 50.

In accordance with other embodiments of the present invention, the cache 50 may be configured such that each input of data that is to be written into the cache 50 must be within the boundaries of one of the segments of the partitions associated with that cache corresponding to a single allocation unit (whether assigned or which may be assigned for a management unit). In accordance with further embodiments of the present invention, the cache 50 may be configured to instruct any component of the storage system 10 or associated with the storage system 10 seeking to write data into the cache 50 to send to the cache as part of a single data input all the data which that component is seeking to write into the cache that is within the boundaries of one of the segments of the partitions associated with that cache corresponding to a single allocation unit (whether assigned or which may be assigned for a management unit).

In accordance with some embodiments of the present invention, once the cache storage space has been allocated for the assigned allocation unit, the cache management module 106 may instruct the IFs 40 to forward the segment of the request which is correlated with the specific segment of the particular partition which corresponds to the assigned allocation unit, and only that segment, to the cache 50. In accordance with some embodiments of the present invention, the cache management module 106 may instruct the IFs 40 to forward a specific sequence of blocks which corresponds to all the blocks within the request which are within the specific segment of the particular partition which corresponds to the assigned allocation unit. In accordance with some embodiments of the present invention, the cache 50 may be configured to instruct the IFs 40 to continue forwarding discrete data inputs data inputs comprised of a specific sequence of blocks which corresponds to all the blocks within the request which are within the specific segment of the particular partition which corresponds to the assigned allocation unit, iteratively until all the data within the request that is associated with a certain partition is received at the cache 50, and this process may continue until the entire request has been forwarded to the one or more cache devices 50 which have been determined to be associated with the various segment of that request.

In accordance with some embodiments of the present invention, the predefined number of allocation units which may be assigned for each management unit in the cache 50 may remain substantially constant throughout the operation of the storage system. However, it should be noted that substantially non-frequent adjustments to the number of allocation units which may be assigned for each management unit in a certain cache may be implemented by the cache management module 106 or any other component of the cache 50, for example, in response to global statistics relating to the performance of the cache 50. The adjustments to the number of allocation units which may be assigned for each management unit may occur in response to one or more predefined events and/or may be routinely or periodically performed in accordance with predefined time cycles or in predetermined time periods.

As mentioned above, in accordance with some embodiments of the present invention, the amount of cache storage space which may be associated with each allocation unit may be predetermined. In accordance with some embodiments of the present invention, the amount of cache storage space associated with each allocation unit may be determined during manufacture and may remain substantially constant. However, in accordance with further embodiments of the present invention, the amount of cache storage space associated with each allocation unit may be adjusted during the life of the cache storage device 50. In accordance with one embodiment of the present invention, the amount of cache storage space associated with each allocation unit may be modified in response to one or more predefined events, in response to variations in system performance and/or in accordance with operation data relating to the performance and/or operation of the cache 50, etc.

As mentioned above, in accordance with some embodiments of the present invention, for each management unit up-to two or more allocation units may be assigned and each allocation unit may be associated with a certain segment of the partition with which the management unit is associated. Each allocation unit may also be associated with a specific amount of cache storage space, and each allocation unit may be used to allocate a certain amount of cache storage space so that the allocated storage space may be used to store data in the cache. In accordance with some embodiments of the present invention, the amount of cache storage space allocated for each allocation unit may constitute only a portion of the cache storage space that would be necessary to store an entire partition. In accordance with further embodiments of the present invention, the storage space which may be allocated for each allocation unit may be used to store one or more data segments associated with a particular portion or particular segment of specific partition with which each of the allocation units may be associated.

In accordance with some embodiments of the present invention, the management units in the cache 50 may be associated with predefined management functions or procedures. As mentioned above, each segment of data in the storage system 10 may be associated with a certain partition. Each segment of data transmitted from or to the IFs 40 to of from the cache(s) 50 may be associated with a specific partition with which that data segment is associated. Similarly, each segment of data transmitted from or to the disk(s) 60 to or from the cache(s) 50 may also be associated with a specific partition with which that data segment is associated. In the cache 50, each management unit may be associated with a certain storage system partition, and all the data in the cache associated with a particular storage system partition may be associated with the management unit associated with that partition.

Thus, in accordance with some embodiments of the present invention, the management units may be associated with management functions or procedures which may be associated with one or more cache and/or storage system functions or procedures involving the collection and/or the processing of data relating to one or more storage system partitions.

In accordance with some embodiments of the present invention, the management units may be associated with management functions or procedures which may be associated with or which may involve storage system components other than or in addition to the cache itself. For example, in accordance with some embodiments of the present invention, the management units may be associated with functions or procedures associated with any interaction between the cache 50 and any of the other storage system components, such as, the disks 60 or the IFs 40, for example, or with any interaction between the cache 50 and the hosts 20. In accordance with further embodiments of the present invention, the management units may be associated with functions or procedures associated with the collection and analysis of various system performance parameters. In accordance with yet further embodiments of the present invention, the management units may be associated with functions or procedures associated with the collection and analysis of information relating to the data currently stored in the cache, but which is not directly related to the allocation units, such as, for example, information relating to the total amount of data currently in the cache which is associated with one or more management units.

In accordance with some embodiments of the present invention, the management units may be associated with one or more of the following management functions or procedures: collecting information relating to one or more of the management units currently in the cache, including the collection and analysis of information relating to data currently in the cache in the management unit level of resolution, for example, determining the total amount of data stored in the combined storage space area associated with all the allocation units assigned for a specific (one or more) management unit (s); managing some aspects of the cache replacement mechanisms or procedures; performing and managing prefetch operations to prefetch data from one of the permanent storage devices 60 associated with the cache 50; and receiving or transmitting data into or out-of the cache 50. However, it should be noted that the present invention is not limited in this respect. Rather, in accordance with some embodiments of the present invention, the management units may be associated with management functions or procedures which may be associated with any cache and/or storage system functions or procedures involving the collection and/or the processing of data relating to one or more storage system partitions. In addition some cache management functions may relate to allocation units, whether exclusively or in addition to similar cache management functions which relate to management units.

Figure 3:
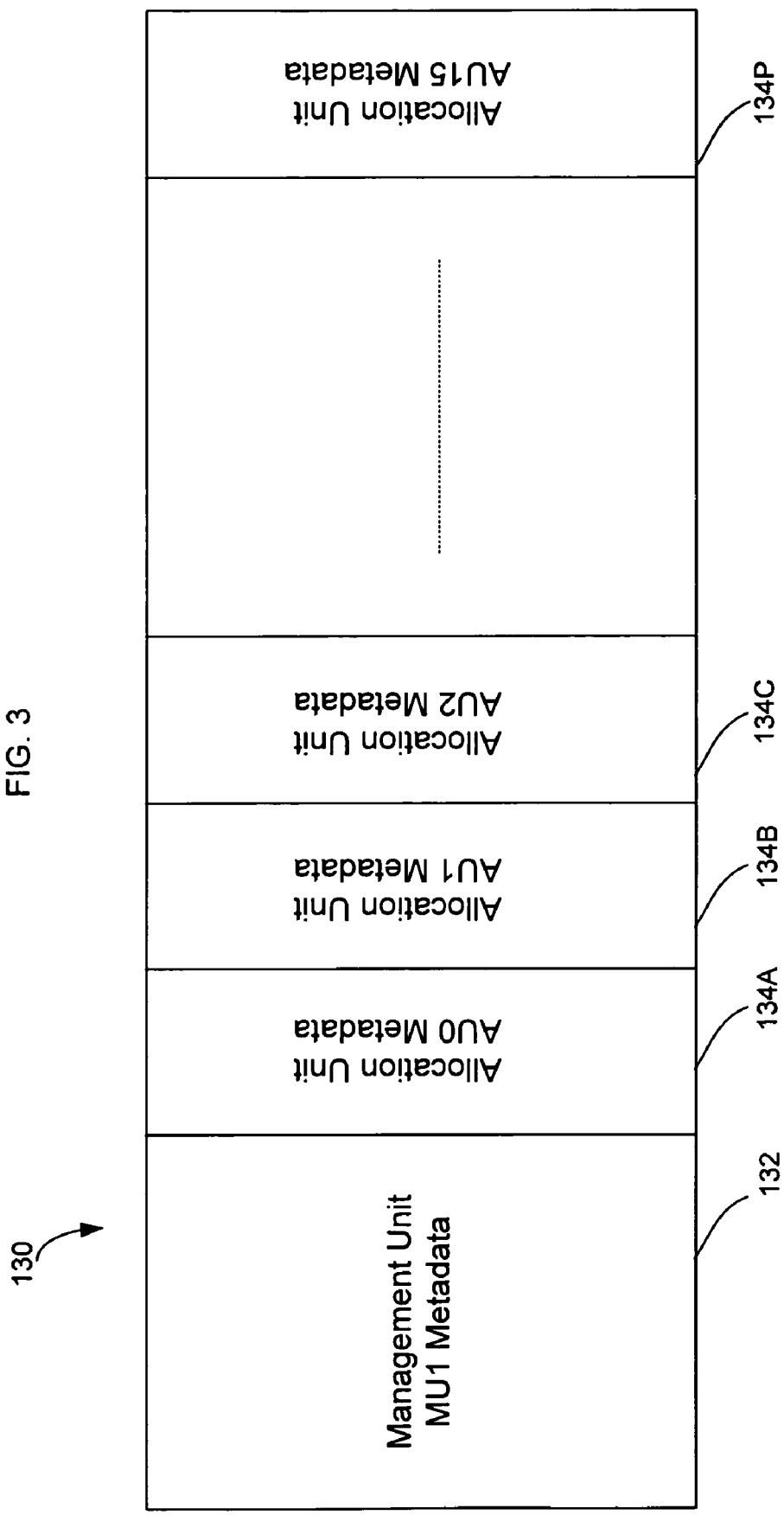
FIG. 3 is a graphical illustration of an exemplary descriptors module entry, in accordance with some embodiments of the present invention.

In accordance with some embodiments of the present invention, the cache storage device 50 may include a descriptors module 108. Reference is now made to FIG. 3, which is a graphical illustration of an exemplary descriptors module entry, in accordance with some embodiments of the present invention. In accordance with some embodiments of the present invention, the descriptors module 108 may include data 130 relating to one or more management units in the cache 50. In accordance with some embodiments of the present invention, the descriptors module 108 may further include data relating to the allocation units in the cache 50. In accordance with further embodiments of the present invention, each allocation unit record 134A-134P in the descriptors module 108 may be associated with the appropriate management unit entry 132 for which it has been assigned or for which it may be assigned in the future.

In accordance with some embodiments of the present invention, whenever a new management unit is generated, the cache management module 106 may be adapted to update the descriptors module 108, and the descriptors module 108 may register the new management unit in a management unit entry 132 associated with the new management unit. In accordance with some embodiments of the present invention, the descriptors module 108 may include one or more entries 132, and each entry 132 may be associated with a certain management unit.

In accordance with further embodiments of the present invention, whenever a management unit is generated and an entry 132 for that management unit is added to the descriptors module 108, the cache management module 106 may be adapted to instruct the descriptors module 108 to record under the management unit entry 132 all the possible allocation units which may be assigned for that management unit, whether actually assigned in the present for that management unit or to be assigned in the future for that management unit. The allocation unit records 134A-134P may be listed under the management unit entry 132 with which they are associated. The allocation unit records may include a status indicator to indicate whether that allocation unit has already been assigned or whether it has yet to be assigned. When a certain allocation unit is assigned, the status indicator may be adjusted such that it indicates that this allocation unit has been assigned.

In accordance with some embodiments of the present invention, both the management unit entries and the allocation unit entries 134A-134P may include META-data, or data about the data associated with the management unit or allocation unit correlated with that entry or record. For example, each management unit entry 132 may include data relating to which partition this management unit is associated with, how many allocation units have already been assigned for that management unit or how many additional allocation units may be assigned for that management unit, when was this management unit generated, when was this management unit last accessed, the total size of cache storage space currently associated with this management unit, indication as to whether the data associated with this management unit was brought into the cache as part of a prefetch operation or not, etc. For example, each allocation unit record 134A-134P may include data specifying the area of the cache storage space which is associated with the allocation unit, the specific segment of the partition with which this allocation unit is associated, indication as to whether this allocation unit was brought into the cache as part of, for example, a write transaction, a read transaction, a prefetch operation, timestamps indicating the time the allocation unit has been assigned, timestamps indicating the time the allocation unit has been accessed, etc.

Once the appropriate entry and/or record is added to the descriptors module (in case that a new management unit was generated and/or a new allocation unit has been assigned) and the appropriate cache storage space area has been allocated, or once the appropriate entry and/or the appropriate record have been updated (in case that an existing management unit is used and/or in case that a previously assigned allocation unit is used) and the appropriate cache storage space area has been designated, the cache management module 106 may instruct the IFs 40 to bring the data associated with a certain segment of a particular partition with which the assigned allocation unit is associated into the cache 50. Alternatively, the cache management module 106 may instruct the Ifs 40 to bring into the cache all the data which is associated with the partition for which the management unit has been generated or selected, and may handle each segment of the particular partition with which a certain assigned allocation unit is associated individually and separately from the rest of the data brought into the cache until all the data brought in the cache is stored in the cache.

In accordance with further embodiments of the present invention, each portion of data to be written into the cache may be stored in the area of the storage space address module 110 which is allocated for the allocation unit with which that portion of data is associated. In accordance with further embodiments of the present invention, at any given point-in-time, the storage space address module 110 may include all the data currently stored in cache 50.

Figure 4:
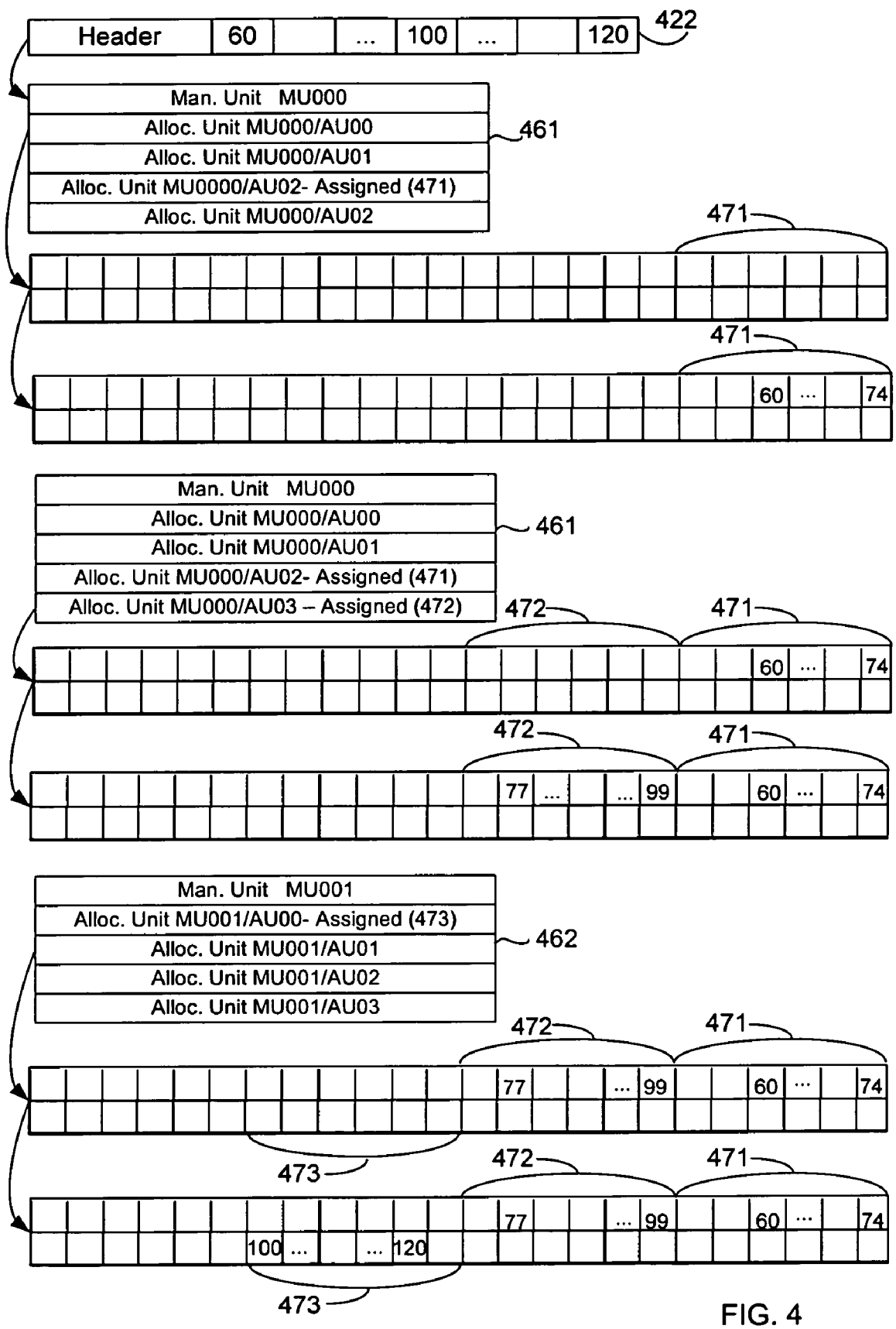
FIG. 4 is a graphical illustration of some aspects of a process of storing newly received data in a cache device, in accordance with some embodiments of the present invention.
Figure 4:
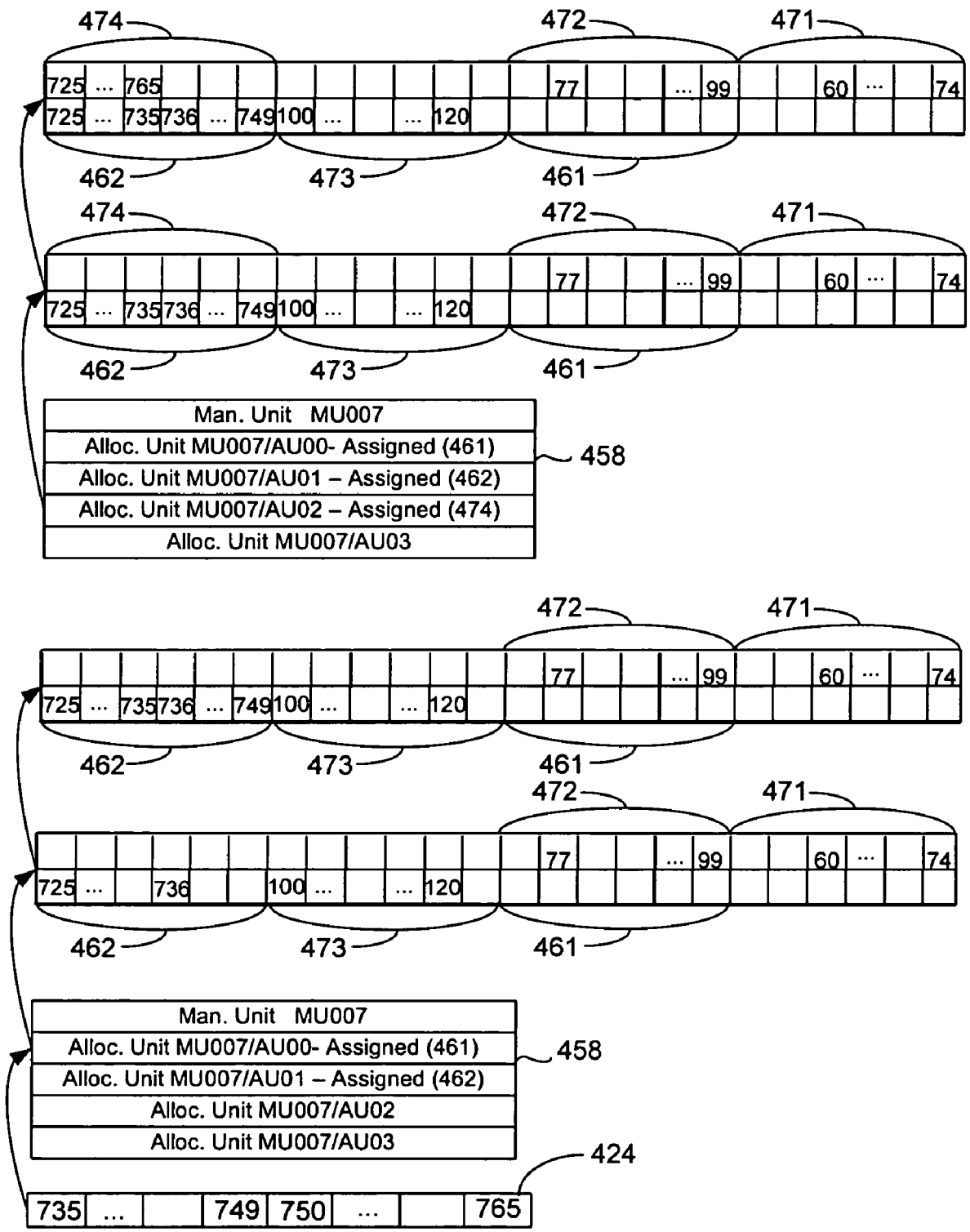

Reference is now made to FIG. 4 which is a graphical illustration of some aspects of the process of storing newly received data in a cache device, in accordance with some embodiments of the present invention. For simplicity of illustration, each row in the cache shown in FIG. 4 represents a cache storage space area that is the equivalent of the amount of storage space which may be necessary to store an entire partition, here 100 blocks. The cache 50 is shown to be full in order to better illustrate some of the advantages of some embodiments of the present invention, however, the present invention is not limited in this respect.

In addition, for illustration purposes, in the cache shown in FIG. 4, for each management unit a total of four allocation units may be assigned, and each allocation unit may correspond to a specific portion of the partition which is correlated with the management unit for which the allocation units may be assigned. For example, for each management unit four allocation units may be assigned, and each of the allocation units assigned for a certain management unit may correspond to a different 25-blocks segment of the partition which is correlated with the management unit.

It should be noted that the size of each partition in the storage system, the size of the cache storage space, the number of allocation unit which may be assigned for each management unit, the size of cache storage space area allocated for each assigned allocation unit, as well as other aspects of the cache shown in FIG. 4 and discussed herein, are exemplary in nature.

In accordance with the embodiments shown in FIG. 4, the IFs 40 may receive a first request 422 from one of the hosts 20. The first request 422 may be comprised of blocks 60-120 of a certain LU, for example, LU1. The IFs 40 may consult the partition map 45 to determine with which partition(s) this request is associated. In accordance with some embodiments of the present invention, the IFs 40 may determine that a first portion of the request which includes blocks 60-99 of LU1 is part of the sequence of blocks including blocks 00-99 of LU1 which comprise partition 000.

In accordance with some embodiments of the present invention, the IFs 40 may then determine which cache is associated with partition 000 (in accordance with the partition map 45) and may notify cache 50 that blocks 60-99 of LU1, which are associated with this cache 50 have been received at the storage system 10. Upon receiving the indication from the IFs 40, the cache 50 may check whether a management unit correlated with the partition which includes blocks 60-99 of LU1 has been already generated. In the embodiment shown in FIG. 4, a management unit associated with partition 000 does not exist. Thus, in accordance with some embodiments of the present invention, the cache 50 may generate management unit MU000, which is correlated with partition 000 (the partition which is comprised of blocks 00-99 of LU1 and which includes blocks 60-99 of LU1).

In accordance with some embodiments of the present invention, as part of the generation of management unit MU000, the cache 50 may add an entry 461 in the descriptors module 108 for management unit MU000. The entry 461 for the newly generated management unit MU000 may include four allocation unit records MU000\AU00, MU000\AU01, MU000\AU02, and MU000\AU03, one for each allocation unit which may be assigned for the newly generated management unit MU000.

In accordance with some embodiments of the present invention, each of the allocation units MU000\AU00, MU000\AU01, MU000\AU02, and MU000\AU03 may correspond to a distinct segment of the partition with which the management unit MU000 corresponds. In the embodiments illustrated in FIG. 4, MU000\AU00 corresponds to blocks 00-24 of LU1, MU000\AU01 corresponds to blocks 25-49 of LU1, MU000\AU02 corresponds to blocks 50-74 of LU1 and MU000\AU03 corresponds to blocks 75-99 of LU1.

In accordance with some embodiments of the present invention, the record associated with each of the allocation units MU000\AU00, MU000\AU01, MU000\AU02, and MU000\AU03 may include data relating to which distinct segment of the partition this particular allocation unit corresponds. In addition, in accordance with some embodiments of the present invention, the record for each allocation unit MU000\AU00, MU000\AU01, MU000\AU02, and MU000\AU03 may include a status indicator to indicate whether that allocation unit has already been assigned, and consequently, whether a certain cache storage space area has already been allocated for that specific allocation unit.

In accordance with some embodiments of the present invention, once the appropriate management unit MU000 has been generated, and the entry 461 for that management unit MU000 was added to the descriptors module 108, including the records for the different allocation units MU000\AU00, MU000\AU01, MU000\AU02, and MU000\AU03, which may be assigned for that management unit MU000, the cache 50 may be adapted to assign allocation unit(s) for the newly generated management unit MU000 in order to allocate a specific cache storage area to enable the storage of the data in the cache 50.

The cache 50 may determine which specific allocation units correspond to the segment of the request 422 which is associated with partition 000 with which the newly generated management unit MU000 is correlated. In the embodiment shown in FIG. 4, two allocation units correspond to the segment of the request which is associated with partition 000 with which the newly generated management unit MU000 is correlated. Here, the first allocation unit MU000\AU02 may correspond to blocks 60-74 of LU1 which are included in the request 422, and the second allocation unit MU000\AU03 may correspond to blocks 75-99 of LU1 which are also included in the request 422.

Accordingly, in accordance with some embodiments of the present invention, the cache 50 may be adapted to assign for the newly generated management unit MU000, the first of these allocation units MU000\AU02. It should be noted that the present invention is not be limited to any particular order by which two or more segments of data associated with the same partition are handled by the cache. Once allocation unit MU000\AU02 is assigned, the cache 50 may allocate storage space area 471 for allocation unit MU000\AU02. Once the cache storage space area 471 is allocated for allocation unit MU000\AU02, and the record associated with allocation unit MU000\AU02 is updated, the status indicator may be modified to indicate that cache storage space area 471 has been allocated for allocation unit MU000\AU02. In the embodiment shown in FIG. 4, as part of the allocation of storage space area 471 for allocation unit MU000\AU02, the cache 50 may be required to discard the data which was previously stored in the cache storage space area 471 to make room for the new data.

In accordance with some embodiments of the present invention, the designation of the specific cache storage area that is to be allocated whenever an allocation unit is assigned may be determined in accordance with the replacement procedures implemented by the cache 50. For example, assuming that the cache is implementing a FIFO replacement procedure (and assuming that the cache 50 has no free space available to allocate for a newly assigned allocation unit), the cache 50 may be required to discard the data stored in the cache storage space area that is the least recent to have been allocated (assuming there is no unallocated cache storage space area currently in the cache) and may reallocate that cache storage space area for the newly assigned allocation unit MU000\AU02. The process of replacing data in the cache is well-known to those of ordinary skill in the art. The present invention is not limited to the use of any one particular replacement procedure, mechanism and/or algorithm and may be applied to any such procedure, mechanism and/or algorithm.

Once the appropriate storage space area 471 has been allocated in the cache 50 and the entry 461 has generated and updated with the data relating to the assigned allocation unit MU000\AU02 and the allocated storage space area 471, the cache 50 may instruct the IFs 40 to bring into the cache 50 the particular segment of the request 422 which corresponds to particular segment of the specific partition 000 to which the assigned allocation unit MU000\AU02 corresponds. In response, the IFs 40 may send to the cache 50 all the data blocks within the request which are within that particular segment of that specific partition 000, in this case, blocks 60-74 of LU1. Alternatively, the cache may instruct the IFs to bring into the cache the entire partition and may handle each segment of data associated with one of the allocation units which may be assigned for the management unit associated with that partition individually. In accordance with some embodiments of the present invention, upon receiving blocks 60-74 of LU1, the cache 50 may authenticate that these blocks are within the particular segment of the specific partition to which the assigned allocation unit MU000\AU02 corresponds, and may store blocks 60-74 of LU1 in the storage space area allocated for that allocation unit MU000\AU02. The cache may then update the descriptors module entry 461 associated with the management unit MU000, including updating the record relating to the allocation unit MU000\AU02 for which the storage space area 471 was allocated.

Once the data corresponding to allocation unit MU000\AU02 has been stored in the cache 50 and the entry 461 updated, the cache 50 may assign the additional allocation unit MU000\AU03 which corresponds to blocks 75-99 of LU1 to the appropriate management unit MU000, and may allocate the appropriate storage space area 472 for the allocation unit MU000\AU03.

As mentioned above, the present invention is not limited with respect to the which mechanism, method or process may be used to decide which particular storage space area is to be allocated for each allocation unit, nor are some embodiments of the present invention, limited to any particular pattern of allocation. The cache storage space area allocated for any two different allocation units (e.g. two allocation units corresponding to consecutive blocks of LU1) may be constrained to any particular pattern and may sometime be geographically removed and in other occasions adjacent as dictated by the replacement mechanism or by any other mechanism implemented by the cache 50 to determine the location of the cache storage space area to be allocated.

Once the appropriate cache storage space area 472 has been allocated for allocation unit MU000\AU03, and the entry 461 has been updated with the data relating to the assigned allocation unit MU000\AU02 and the allocated storage space area 472, the cache 50 may instruct the IFs 40 to bring into the cache 50 the particular segment of the request 422 which corresponds to particular segment of the specific partition 000 to which the assigned allocation unit MU000\AU03 corresponds. In response, the IFs 40 may send to the cache 50 all the data blocks in the request which are within that particular segment of that specific partition 000, in this case, blocks 75-99 of LU1. In accordance with some embodiments of the present invention, upon receiving blocks 75-99 of LU1, the cache 50 may authenticate that these blocks are within the particular segment of the specific partition 000 to which the assigned allocation unit MU000\AU03 corresponds, and may store blocks 75-99 of LU1 in the storage space area 472 allocated for that allocation unit MU000\AU03. The cache may then update the descriptors module entry 461 associated with the management unit MU000 corresponding to the partition with which the stored data is associated, including updating the record relating to the allocation unit MU000\AU03 for which the storage space area 472 used to store the data was allocated.

In accordance with some embodiments of the present invention, once the storage of the data corresponding to the first partition 000 is completed, the IFs 40 may determine whether there is any additional data in the request which is associated with the cache 50. If the IFs 40 determine that there is such additional data, as is the case in the embodiment illustrated in FIG. 4, the IFs 40 may consult the partition map 45 to determine with which partition(s) the remainder of the request is associated. In accordance with some embodiments of the present invention, the IFs 40 may determine that a second portion of the request which includes blocks 100-120 of LU1 is part of the sequence of blocks including blocks 100-199 of LU1 which comprises partition 001.

In accordance with some embodiments of the present invention, the IFs 40 may then determine which cache is associated with partition 001 (in accordance with the partition map 45), for example, the same cache 50 as above, and may notify the cache 50 that blocks 100-120 of LU1, which are associated with this cache 50 have been received at the storage system 10. Upon receiving the indication from the IFs 40, the cache 50 may check whether a management unit correlated with the partition which includes blocks 100-120 of LU1 has been already generated. In the embodiment shown in FIG. 4, a management unit associated with partition 001 does not exist. Thus, in accordance with some embodiments of the present invention, the cache 50 may generate management unit MU001, which is correlated with partition 001 (the partition which is comprised of blocks 100-199 of LU1 and which includes blocks 100-120 of LU1).

In accordance with some embodiments of the present invention, as part of the generation of management unit MU001, the cache 50 may add an entry 462 in the descriptors module 108 for management unit MU001. The entry 462 for the newly generated management unit MU001 may include four allocation unit records MU001\AU00, MU001\AU01, MU001\AU02, and MU001\AU03, one for each allocation unit which may be assigned for the newly generated management unit MU001.

In accordance with some embodiments of the present invention, each of the allocation units MU001\AU00, MU001\AU01, MU001\AU02, and MU001\AU03 may correspond to a distinct segment of the partition with which the management unit MU001 corresponds. In the embodiments illustrated in FIG. 4, MU001\AU00 corresponds to blocks 100-124 of LU1, MU001\AU01 corresponds to blocks 125-149 of LU1, MU001\AU02 corresponds to blocks 150-174 of LU1 and MU001\AU03 corresponds to blocks 175-199 of LU1. Each record may include data relating to the allocation unit and the storage space assigned for that allocation unit, as discussed above.

In accordance with some embodiments of the present invention, once the appropriate management unit MU001 has been generated, and the entry 462 for that management unit MU001 was added to the descriptors module 108, including the records for the different allocation units MU001\AU00, MU001\AU01, MU001\AU02, and MU001\AU03, which may be assigned for that management unit MU001, the cache 50 may be adapted to assign allocation unit(s) for the newly generated management unit MU001 in order to allocate a specific cache storage area to enable the storage of the data in the cache 50.

The cache 50 may determine which specific allocation unit corresponds to the segment of the request 422 which is associated with partition 001 with which the newly generated management unit MU001 is correlated. In the embodiment shown in FIG. 4, allocation unit MU001\AU00 is the only one which corresponds to the segment of the request which is associated with partition 001. Accordingly, in accordance with some embodiments of the present invention, the cache 50 may be adapted to assign allocation unit MU001\AU00 for the newly generated management unit MU001. Once allocation unit MU001\AU00 is assigned, the cache 50 may allocate storage space area 473 for allocation unit MU001\AU00. Once the cache storage space area 473 is allocated for allocation unit MU001\AU00, and the record associated with allocation unit MU001\AU00 is be updated, the status indicator may be modified to indicate that cache storage space area 473 has been allocated for allocation unit MU001\AU00. The cache 50 may now instruct the IFs 40 to bring into the cache 50 the particular segment of the request 422 which corresponds to particular segment of the specific partition 001 to which the assigned allocation unit MU001\AU00 corresponds. In response, the IFs 40 may send to the cache 50 all the data blocks within the request which are within that particular segment of that specific partition 001, in this case, blocks 100-120 of LU1.

In accordance with some embodiments of the present invention, upon receiving blocks 100-120 of LU1, the cache 50 may authenticate that these blocks are within the particular segment of the specific partition 001 to which the assigned allocation unit MU001\AU00 corresponds, and may store blocks 100-120 of LU1 in the storage space area 473 allocated for that allocation unit MU001\AU00. The cache may then update the descriptors module entry 462 associated with the management unit MU001, including updating the record relating to the allocation unit MU001\AU00 for which the storage space area 473 was allocated.

With the storage of blocks 100-120 of LU1, the storage of the first request 422 is completed. Now, in accordance with some embodiments of the present invention, the cache 50 may decide to fetch from the disk(s) 60 a sequence of blocks 424. In the embodiment shown in FIG. 4, the sequence of blocks that is to be fetched from the disk may be associated with a third partition, for example, partition 008 comprised of blocks 700-799. In accordance with some embodiments of the present invention, the cache 50 may check whether a management unit correlated partition 008 has already been generated. In this case, the descriptors module 108 already includes an entry 458 which is associated with a management unit MU007 which is correlated with this partition 008 and it is does concluded that a management unit has already been generated for partition 008.

In accordance with some embodiments of the present invention, the cache 50 may request the disk(s) 60 to indicate to the cache 50 which blocks of partition 008 are stored in the disk(s) 60. In the embodiment shown in FIG. 4, an indication may be received from the disk(s) that the blocks which are associated with partition 008 and which are stored in the disks include blocks 735-765 of LU1.

In accordance with some embodiments of the present invention, since the appropriate management unit MU007 and the descriptors module entry 458 already exist, the cache 50 may proceed to instruct the disk 60 to bring into the cache a sequence of associated with one of the allocation units of management unit MU007. In accordance with some embodiments of the present invention, the cache 50 may be adapted to instruct the disk (or any other component from data is to be brought into the cache) to bring into the cache 50 each time, a sequence of blocks comprised of all the blocks within that components (one or more) which are within the boundaries with which a specific allocation unit is correlated.

In the embodiment shown in FIG. 4, a first segment of the data to be fetched 424 which is comprised of blocks 735-749 of LU1 may correlated with MU007\AU01, and a second segment of data to be fetched 424 which is comprised of blocks 750-765 of LU1 may be correlated with allocation unit MU007\AU02. Here we assume that the cache 50 handles the first segment of the data to be fetched 424 first. Since management unit MU007 already existed prior to the initiation of the fetch process, the cache may check the entry 458 associated with management unit MU007, to determine whether allocation unit MU007\AU01 has already been assigned.

In the embodiment shown in FIG. 4, in the descriptors module entry 458 associated with management unit MU007, it is indicated that allocation unit MU007\AU01 has already been assigned (as well as allocation unit MU007\AU000) and that cache storage area 462 has already been allocated for allocation unit MU007\AU01. In accordance with some embodiments of the present invention, in this case, the cache 50 may simply request the disk 60 to bring into the cache the sequence of blocks associated with this allocation unit MU007\AU001, in this case blocks 735-749.

In FIG. 4, blocks 725-736 are already stored in the cache storage space area 461 allocated for allocation unit MU007\AU001. In accordance with some embodiments of the present invention, the cache 50 may be configured to replace the overlapping data with the most recent data and to store the most recent data in the cache 50. Thus, blocks 735-736 may be replaced and in addition blocks 737-749 may be added to the cache 50 and may be stored in the cache storage space area 462 allocated for allocation unit MU007\AU001. Blocks 725-734 may remain unaffected in the cache. However, the present invention is not limited in this respect and any other configuration may be applied as part of some embodiments of the present invention.

In accordance with some embodiments of the present invention, the cache may now update the data in the entry 458 relating to management unit MU007 and in the record of entry 458 relating to allocation unit MU007\AU01 to indicate the activity in that management unit and allocation unit. The data included in the descriptor module's entries and records was discussed in greater detail above.

Next, the cache 50 may determine whether there is additional data to be fetched into the cache 50. In this case, the cache 50 may determine that blocks 750-765 of LU1 are also to be fetched into the cache 50. Accordingly, the cache 50 may check whether an allocation unit corresponding to blocks 750-765 has been assigned for the management unit MU007 correlated with the partition 008 with which blocks 750-765 are associated.

In the embodiment shown in FIG. 4, the cache may determine that the allocation unit which corresponds to blocks 750-765 of LU1 is allocation unit MU007\AU02, and that allocation unit MU007\AU02 has yet to have been assigned. Consequently, the cache 50 may assign allocation unit MU007\AU02 to the appropriate management unit, in this case management unit MU007. Once assigned, the cache may allocate a cache storage space area 474 for allocation unit MU007\AU02 in order to enable the storage of the data associated with the allocation unit MU007\AU02 in the cache 50.

In accordance with some embodiments of the present invention, the cache 50 may now request the disk to bring into the cache 50 blocks 750-765 of LU1, and upon receiving the blocks, the cache 50 may store the blocks in the cache storage space area 474 allocated for the allocation unit MU007\AU02 which corresponds to the sequence of blocks including blocks 750-765 of LU1. In accordance with some embodiments of the present invention, in concurrence with the storage of the data in the cache 50 or substantially immediately thereafter, the cache 50 may update the descriptors module entry 458 and the appropriate record associated with the data recently brought into the cache 50.

Figure 5:
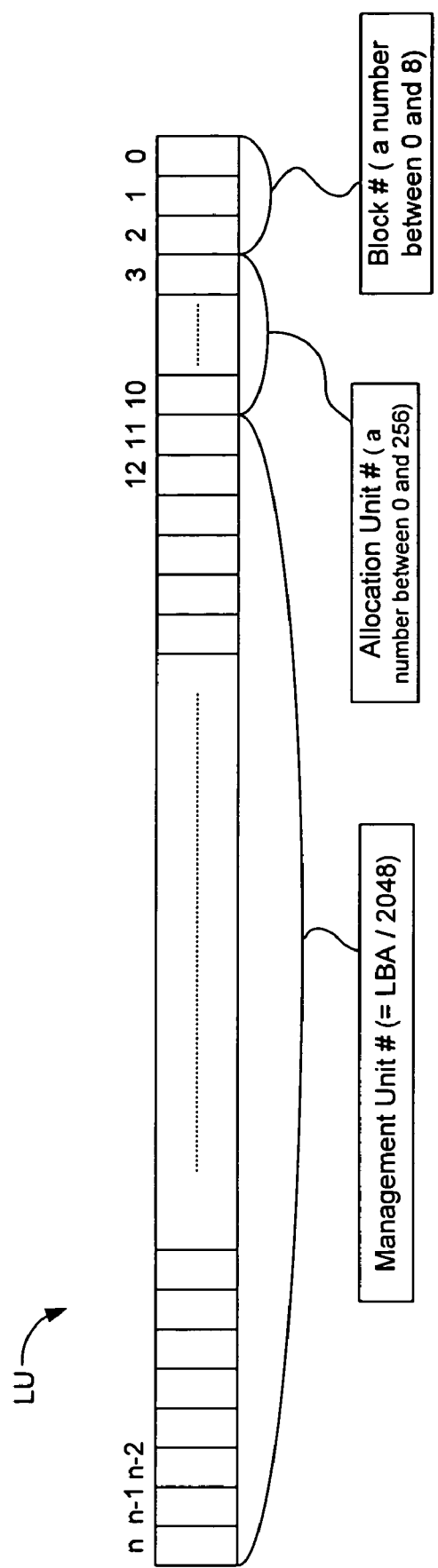
FIG. 5 is which is a graphical illustration of an exemplary block address string which may be associated with each block of data in the cache, in accordance with some embodiments of the present invention.

Reference is now made to FIG. 5, which is a graphical illustration of an exemplary block address string which may be used to specify the block number of any block of data within a certain logical unit, and from which, in accordance with some embodiments of the present invention, the cache may be adapted to extract data relating to the specific management unit and the specific allocation unit with which each block is associated. In accordance with some embodiments of the present invention, each data block within the storage system 10 and each data block arriving from a component outside associated with the storage system 10 may be associated with a specific Logical Block Address (LBA). The LBA may indicate the block's block number within the LU to which it belongs.

In accordance with some embodiments of the present invention, the LBA may be a serial number which may indicate the position of a certain block of data in the succession of blocks in a certain logical unit in the storage system. Accordingly, the LBA may be represented by a binary string of length n that may represent any value ranging from 0, the first block in the logical unit, and up to the value in the last block in the logical unit.

In accordance with some embodiments of the present invention, each LBA may be configured to indicate to the cache and the cache 50 may be adapted to deduce from each LBA the management unit number with which the block is correlated, the specific allocation unit number to which the specific block corresponds.

In accordance with some embodiments of the present invention, the cache may also deduce which one of a specific number of blocks which may correspond to each specific allocation unit this block is. For example, in case that each allocation unit corresponds to specific 8 blocks of a certain LU, the LBA may be configured to indicate to the cache with which management unit a certain block is correlated, to which allocation unit the block corresponds and which one of the 8 blocks which may correspond to this specific allocation unit this block is. However, in accordance with further embodiments of the present invention in order to distinguish the block itself, the cache 50 may be adapted to simply use the original LBA number indicating the position of the block in the succession of blocks in the logical unit, and thus each block in the cache 50 may be associated with only the management unit number and the allocation unit number in addition to the original LBA number.

In the embodiment shown in FIG. 5, each block is 0.5 kilobytes in size, each allocation unit may be associated with 8 data blocks (and is thus 4 kilobytes in size) and for each management unit 256 allocation units may be assigned, and consequently, each management unit may be associated with 2048 data blocks (and is thus 1 MB in size).

Thus, in accordance with the above embodiment of the present invention, the cache 50 may generate for each partition in the storage system a management unit which is associated with one of the 1 MB partitions. For each management unit the cache may assign 256 allocation units, and each allocated unit may be used to allocate 4 kilobytes of cache storage space which are may be used to store up-to 8 0.5 kilobyte blocks of data, each of which being specifically associated with one allocation unit which is in turn specifically associated with one management unit.

Thus, whenever a segment of data which is to be written into the cache is not associated with any partition already stored in the cache, the cache may not be obliged to allocate the full (one or more) 1 MB of cache storage space associated with each management unit which corresponds to a full partition, and may instead allocate one or more 4 kilobyte segments of cache storage space in order to store the newly received data in the cache.

In accordance with some embodiments of the present invention, whenever a data block is stored in the cache 50, its LBA is recorded in the descriptors module under the allocation unit record with which this block is correlated. In embodiment shown in FIG. 5, the rightmost square represents the least significant bit (bit 0). Bits 0-2 are used to represent the block number with which the LBA is associated; bits 3-10 are used to represent the allocation unit (one of 256) which is associated with this LBA; and the value represented by bits 11-$n$ is used to represent the management unit with which this LBA is associated. Thus, given any LBA it may be possible to establish with which management unit a certain block (one or more) is correlated, to which allocation unit that block corresponds and the position of that block within the allocation unit to which it corresponds. The cache 50 may thus be adapted to search each block in the descriptors module in accordance with its LBA, and in case a management unit has been generated and an allocation unit has been assigned for that block (either alone or in addition with other blocks), the descriptors' module record associated with that specific allocation unit may be able to provide the cache 50 with the exact position of that specific block in the cache.

Figure 6:
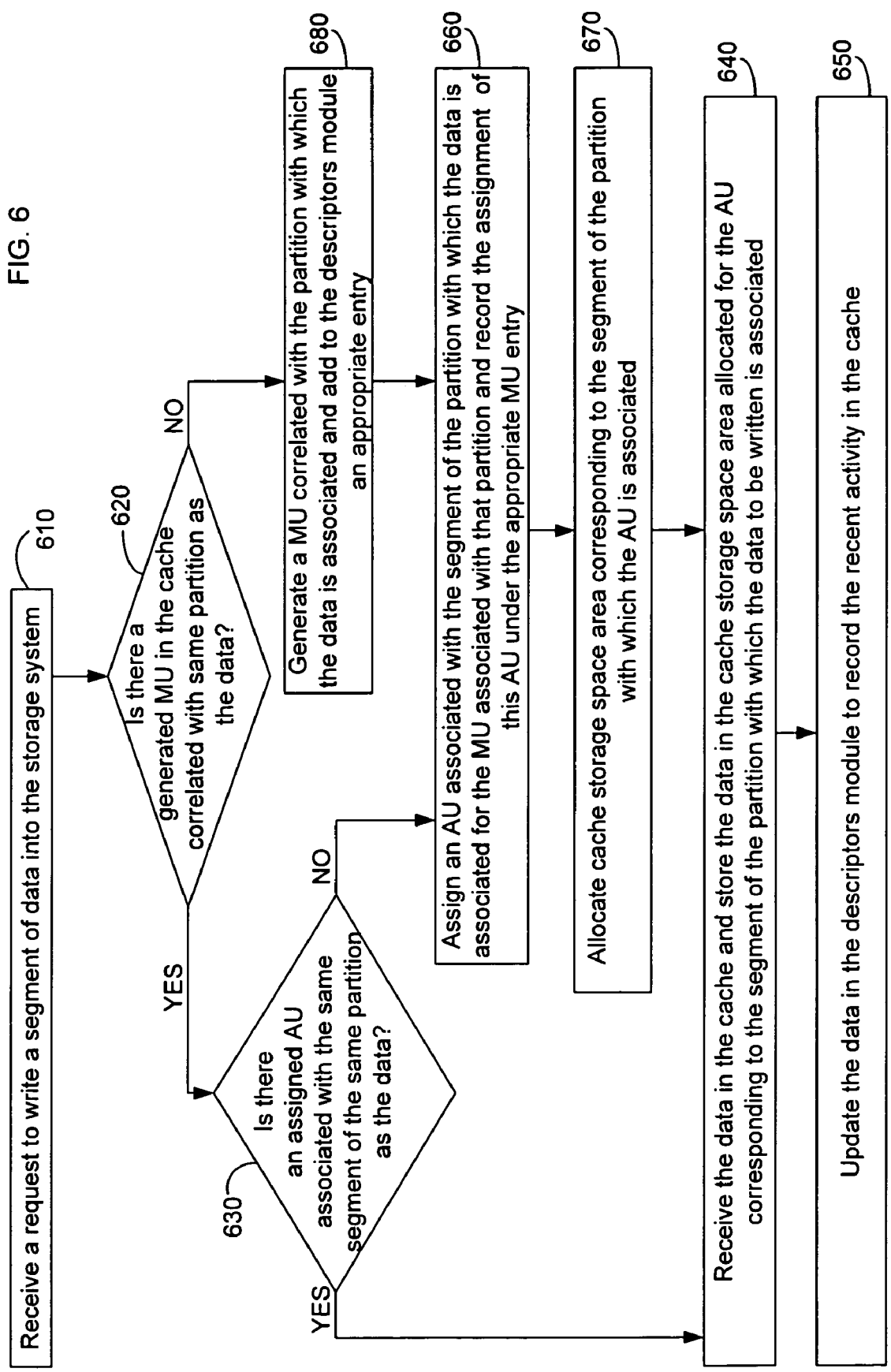
FIG. 6 is a flow chart illustration of a method of efficiently managing a cache storage device, in accordance with some embodiments of the present invention.

Reference is now made to FIG. 6, which is a flow chart illustration of a method of efficiently managing a cache storage device, in accordance with some embodiments of the present invention. Initially a write request may be generated to write data into the cache (block 610). Those of ordinary skill in the art may appreciate that a request to write data into the cache(s) may be generated or triggered as part of various activities or functions within the storage system and that the present invention is not limited to a particular activity as part of which the request to write data into the cache(s) is generated.

One type of system activity which, as part of which, a request to write data into the cache may be generated may be associated with requests to write data into the storage system. As part of the response to the request to write data into the storage system, a request may be generated to write some or all of the data associated with the request into the cache where it may be substantially temporarily and transitionally stored. Another type of system activity which, as part of which, a request to write data into the cache may be generated may be associated with various internal data copy or data shifting activities within the storage system, including but not limited to, as part of a response to a read request. In the storage system, when moving data within the storage system or when retrieving data from one of the substantially permanent storage devices, a request may be generated to write some or all of the data to be moved or to be retrieved into the cache associated with the permanent storage device from which the data is to be taken. It should be appreciated that such requests to write data into the cache are also within the scope of the present invention, and that the present invention is not limited to any particular kind or type of requests to write data into the cache.

Each request for writing data into the cache may include the data (or reference to the data) that is to be written into the cache. The request may be directed to the cache(s) which is correlated with the storage system partitions with which the request is associated. In accordance with some embodiments of the present invention, since each cache is defined to be responsible for certain storage system partitions, the requests to write data into the cache may be distributed in accordance with the storage system partitions with which the data to be written into the cache is associated. Various techniques and components may be used to determine which cache is associated with which request to write data into the cache and to direct the request to the appropriate cache, including but not limited, the IFs described above, switches, etc.

In accordance with some embodiments of the present invention, as part of generating a request to write data into the cache, an indication may be generated for each portion of the request which is associated with a different partition. The indication may be configured to notify to the relevant cache that a certain portion of the request to write data into the cache (including all the data) is correlated with a certain partition with which that particular cache is associated and may be sent to that cache. In accordance with some embodiments of the present invention, an indication may be sent to the relevant cache only if that cache is not currently in the process of handling a different portion of data. Thus, if a certain request to write data into the cache is associated with more than one partition which are correlated with a single cache, more than one indication may be generated and each indication may be delayed until the handling of the data with which the preceding indication was associated by the cache is completed.

In accordance with some embodiments of the present invention, upon receiving a certain indication relating to a portion of a request to write data into the cache which is associated with a partition with which that cache is correlated, the cache may determine whether there is an existing (generated) management unit in the cache which is correlated with the partition with which that portion of the request to write data into the cache is associated (block 620). For example, the indication may include the LBAs of the blocks within that portion of the request to write data into the cache, and the cache may determine whether there is a management unit in the cache which is correlated with these LBAs.

In case that it is determined at block 620 that for the partition which is associated with the portion of the request to write data into the cache for which an indication has been received in the cache, the cache already generated a management unit, the cache may proceed to determine whether allocation units (one or more) which correspond to one or more segments of that portion of the request to write data into the cache have been assigned for the management unit (block

630). As mentioned above, each allocation unit may be associated with a particular segment (e.g., a specific sequence of blocks) of a certain partition. Thus, if any of the blocks which are correlated with a certain partition for which an indication has been received in the cache are within a segment of the partition which corresponds to one of the allocation units which may be assigned for the management unit correlated with that partition, upon receiving such an indication the cache may check whether these allocation units have already been assigned for that management unit or not.

If it is determined allocation units (one or more) which correspond to one or more segments of that portion of the request to write data into the cache have been assigned for the management unit, the cache may signal to the IFs to bring that portion of the request into the cache and may proceed to store the data in the storage space areas (one or more) allocated for that allocation unit (block 640). In accordance with some embodiments of the present invention, once the data is stored in the cache, the descriptors module may be updated to record the recent activity in the cache (block 650). In accordance with further embodiments of the present invention, the entries corresponding to the management unit with which the data written into the cache is associated may be updated. In accordance with yet further embodiments of the present invention, the records corresponding to the allocation unit(s) associated with the data to be written into the cache may also be updated.

However, in accordance with some embodiments of the present invention, if it is determined at block 630, that none of the allocation units (one or more) which correspond to one or more segments of that portion of the request to write data into the cache have been assigned for the management unit associated with portion of the request to write data into the cache for which and indication have been received from the IFs, the cache may assign the appropriate allocation units (one or more) for the management unit associated with the data to be written into the cache. In accordance with some embodiments of the present invention, the allocation units which are to be assigned by the cache for the management unit may be associated with the particular segment of the specific partition with which the portion of the request to be written into the cache is associated (block 660).

In accordance with some embodiments of the present invention, once the allocation units (one or more) have been assigned for the management unit, cache storage space corresponding to the segment of the partition with which the assigned allocation unit is associated may be allocated in the cache's data storage space address module (block 670). In accordance with further embodiments of the present invention, the cache may then record the assigned allocation unit in the descriptors module under the appropriate management unit entry (the management unit entry corresponding to the management unit for which the allocation unit associated with the allocation unit record has been assigned).

Once the allocation units which are associated with the particular segments of the specific partition with which the portion of the request to be written into the cache is associated has been assigned for the management unit and cache storage space area(s) has been allocated for the allocation units, the cache may proceed to instruct the IFs to bring the portion of the data corresponding to the partition into the cache, and the cache may store the data in the cache in the storage space area(s) allocated for the allocation unit(s) corresponding to the segment of the partition with which the data to be written into the cache is associated (block 640). In accordance with some embodiments of the present invention, once the data is stored in the cache, the descriptors module may be updated to record the recent activity in the cache (block 650).

However, if it is determined at block 620 that none of the existing management units in the cache is correlated with the partition to which the portion of the request to write data into the cache to which the indication received at the cache relates, the cache may be required to generate a management unit correlated with the partition to which the indication relates. From there, the cache may proceed with the process described in blocks 660, 670, 640 and 650, which were described above in detail.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method for managing a cache storage device, the method comprising the steps of:
dividing, by the cache storage device, the cache storage device into a plurality of partitions;
generating, by the cache storage device, a plurality of management units to manage the plurality of partitions;
correlating, by the cache storage device, a respective one of the plurality of management units with each of the plurality of partitions;
dividing each of the plurality of partitions into a plurality of segments for storing data;
generating, by the cache storage device, a plurality of allocation units to manage the plurality of segments;
assigning each of the plurality of allocation units to a respective one of the plurality of management units;
correlating each respective allocation unit with one of the plurality of segments;
receiving data for storage in the cache storage device, the data received in a single request;
allocating, by a first management unit generated by the cache storage device and correlated with a first partition, the first partition for storing a first portion of the data; and
allocating, by a second management unit generated by the cache storage device and correlated with a second partition, the second partition for storing a second portion of the data.

2. The method of claim 1, wherein the step of allocating the first partition for storing the first portion of the data further comprises the step of allocating, via a first allocation unit, a first segment within the first partition for storing a sub-portion of the first portion of the data.

3. The method of claim 1, wherein the step of allocating the second partition for storing the second portion of the data further comprises the step of allocating, via a first allocation unit, a first segment within the second partition for storing a sub-portion of the second portion of the data.

4. The method of claim 3, wherein the step of allocating the first partition for storing the first portion of the data further comprises the step of allocating, via a second allocation unit, a first segment within the first partition for storing a sub-portion of the first portion of the data.

5. A computer-readable medium comprising instructions that, when executed by a processor, cause the processor to perform a method for managing a cache storage device comprising the steps of:
dividing, by the cache storage device, the cache storage device into a plurality of partitions;
generating, by the cache storage device, a plurality of management units to manage the plurality of partitions;

correlating, by the cache storage device, a respective one of the plurality of management units with each of the plurality of partitions;

dividing each of the plurality of partitions into a plurality of segments for storing data;

generating, by the cache storage device, a plurality of allocation units to manage the plurality of segments;

assigning each of the plurality of allocation units to a respective one of the plurality of management units;

correlating each respective allocation unit with one of the plurality of segments;

receiving data for storage in the cache storage device, the data received in a single request;

allocating, by a first management unit generated by the cache storage device and correlated with a first partition, the first partition for storing a first portion of the data; and allocating, by a second management unit generated by the cache storage device and correlated with a second partition, the second partition for storing a second portion of the data.

6. The computer-readable medium of claim 5, wherein the instructions for performing the step of allocating the first partition for storing the first portion of the data further comprises instructions for performing the step of allocating, via a first allocation unit, a first segment within the first partition for storing a sub-portion of the first portion of the data.

7. The computer-readable medium of claim 5, wherein the instructions for performing the step of allocating the second partition for storing the second portion of the data further comprises instructions for performing the step of allocating, via a first allocation unit, a first segment within the second partition for storing a sub-portion of the second portion of the data.

8. The computer-readable medium of claim 7, wherein the instructions for performing step of allocating the first partition for storing the first portion of the data further comprises instructions for performing the step of allocating, via a second allocation unit, a first segment within the first partition for storing a sub-portion of the first portion of the data.

9. An apparatus for managing a cache storage device, comprising:

means for dividing the cache storage device into a plurality of partitions;

means for generating a plurality of management units to manage the plurality of partitions;

means for correlating a respective one of the plurality of management units with each of the plurality of partitions;

means for dividing each of the plurality of partitions into a plurality of segments for storing data;

means for generating a plurality of allocation units to manage the plurality of segments;

means for assigning each of the plurality of allocation units to a respective one of the plurality of management units;

means for correlating each respective allocation unit with one of the plurality of segments;

means for receiving data for storage in the cache storage device, the data received in a single request;

a first management unit, generated by the cache storage device and correlated with a first partition, for allocating the first partition for storing a first portion of the data; and a second management unit, generated by the cache storage device and correlated with a second partition, for allocating the second partition for storing a second portion of the data.

10. The apparatus of claim 9, further comprising a first allocation unit assigned to the first management unit for allocating a first segment within the first partition for storing a first sub-portion of the first portion of the data.

11. The apparatus of claim 9, further comprising a first allocation unit assigned to the second management unit for allocating a first segment within the second partition for storing a sub-portion of the second portion of the data.

12. The apparatus of claim 11, further comprising a second allocation unit assigned to the second management unit for allocating a second segment within the first partition for storing a second sub-portion of the first portion of the data.

13. A method for managing a cache storage device, the method comprising the steps of:

dividing, by the cache storage device, the cache storage device into a plurality of partitions;

generating, by the cache storage device, a plurality of management units to manage the plurality of partitions;

correlating, by the cache storage device, a respective one of the plurality of management units with each of the plurality of partitions;

dividing each of the plurality of partitions into a plurality of segments for storing data;

generating, by the cache storage device, a plurality of allocation units to manage the plurality of segments;

assigning each of the plurality of allocation units to a respective one of the plurality of management units;

correlating each respective allocation unit with one of the plurality of segments;

receiving data for storage in the cache storage device, the data received in a single request;

allocating, by a first management unit generated by the cache storage device and correlated with a first partition, the first partition for storing a first portion of the data;

allocating, by a first allocation unit generated by the cache storage device and assigned to the first management unit, a first segment within the first partition for storing a first sub-portion of the data; and allocating, by a second allocation unit generated by the cache storage device and assigned to the first management unit, a second segment within the first partition for storing a second sub-portion of the data.

14. The method of claim 13, further comprising the step of allocating, by a second management unit generated by the cache storage device and correlated with a second partition, the second partition for storing a second portion of the data.

15. The method of claim 14, further comprising the step of allocating, by a third allocation unit generated by the cache storage device and assigned to the second management unit, a first segment within the second partition for storing a third sub-portion of the data.

16. A computer-readable medium comprising instructions that, when executed by a processor, cause the processor to perform a method for managing a cache storage device comprising the steps of:

dividing, by the cache storage device, the cache storage device into a plurality of partitions;

generating, by the cache storage device, a plurality of management units to manage the plurality of partitions;

correlating, by the cache storage device, a respective one of the plurality of management units with each of the plurality of partitions;

dividing each of the plurality of partitions into a plurality of segments for storing data;

generating, by the cache storage device, a plurality of allocation units to manage the plurality of segments;

assigning each of the plurality of allocation units to a respective one of the plurality of management units;

correlating each respective allocation unit with one of the plurality of segments;

receiving data for storage in the cache storage device, the data received in a single request;

allocating, by a first management unit generated by the cache storage device and correlated with a first partition, the first partition for storing a first portion of the data;

allocating, by a first allocation unit generated by the cache storage device and assigned to the first management unit, a first segment within the first partition for storing a first sub-portion of the data; and allocating, by a second allocation unit generated by the cache storage device and assigned to the first management unit, a second segment within the first partition for storing a second sub-portion of the data.

17. The computer-readable medium of claim 16, further comprising instructions for performing the step of allocating, by a second management unit generated by the cache storage device and correlated with a second partition, the second partition for storing a second portion of the data.

18. The computer-readable medium of claim 17, further comprising instructions for performing the step of allocating, by a third allocation unit generated by the cache storage device and assigned to the second management unit, a first segment within the second partition for storing a third sub-portion of the data.

19. An apparatus for managing a cache storage device, comprising:

means for dividing the cache storage device into a plurality of partitions;

means for generating a plurality of management units to manage the plurality of partitions;

means for correlating a respective one of the plurality of management units with each of the plurality of partitions;

means for dividing each of the plurality of partitions into a plurality of segments for storing data;

means for generating a plurality of allocation units to manage the plurality of segments;

means for assigning each of the plurality of allocation units to a respective one of the plurality of management units;

means for correlating each respective allocation unit with one of the plurality of segments;

means for receiving data for storage in the cache storage device, the data received in a single request;

a first management unit, generated by the cache storage device and correlated with a first partition, for allocating the first partition for storing a first portion of the data;

a first allocation unit, generated by the cache storage device and assigned to the first management unit, for allocating a first segment within the first partition for storing a first sub-portion of the first portion of the data; and a second allocation unit, generated by the cache storage device and assigned to the first management unit, for allocating a second segment within the first partition for storing a second sub-portion of the first portion of the data.

20. The apparatus of claim 19, further comprising a second management unit, generated by the cache storage device and correlated with a second partition, for allocating the second partition for storing a second portion of the data.

21. The apparatus of claim 20, further comprising a third allocation unit, generated by the cache storage device and assigned to the second management unit, for allocating a first segment within the second partition for storing a sub-portion of the second portion of the data.

* * * * *